United States Patent [19]

Vis

[11] Patent Number: 4,490,913

[45] Date of Patent: Jan. 1, 1985

[54] LOW CONTACT FORCE POSITION SENSING PROBE

[76] Inventor: Arthur D. Vis, 28424 Universal, Warren, Mich. 48092

[21] Appl. No.: 460,108

[22] Filed: Jan. 24, 1983

[51] Int. Cl.³ .......................... G01B 5/02; G01B 7/02
[52] U.S. Cl. ............................... 33/172 E; 33/DIG. 2
[58] Field of Search .......... 33/169 R, 172 E, DIG. 2, 33/DIG. 5, DIG. 6

[56] References Cited

U.S. PATENT DOCUMENTS

| | | | |
|---|---|---|---|
| 2,313,989 | 3/1943 | Caldwell et al. | 33/DIG. 5 |
| 2,833,046 | 5/1958 | Jeglum | 33/172 E |
| 3,839,944 | 10/1974 | Swift | 33/172 E |
| 3,987,552 | 10/1976 | Raiteri | 33/172 E |
| 4,175,331 | 11/1979 | Johnson | 33/172 E |
| 4,292,740 | 10/1981 | Vis et al. | 33/172 E |

FOREIGN PATENT DOCUMENTS

| | | | |
|---|---|---|---|
| 1222273 | 8/1966 | Fed. Rep. of Germany | 33/172 E |
| 708168 | 7/1931 | France | 33/DIG. 6 |
| 2018999 | 10/1979 | United Kingdom | 33/172 E |

*Primary Examiner*—Richard R. Stearns
*Attorney, Agent, or Firm*—Krass & Young

[57] ABSTRACT

A probe for sensing the position of an object relative to a reference point includes a contact tip extensibly mounted on a probe body by means of a piston assembly which transmits minimal force to the object through the tip after the tip contacts the object. The piston assembly includes a fluid driven piston which is normally spring biased to a retracted position. The tip is mounted on one end of a shaft which is slidably mounted on the piston so as to be displaced relative to the piston only after the tip contacts the object. The other end of the shaft forms the core of an LVDT which transforms linear displacement of the shaft into electrical signals indicative of the position of the object relative to the reference point.

9 Claims, 3 Drawing Figures

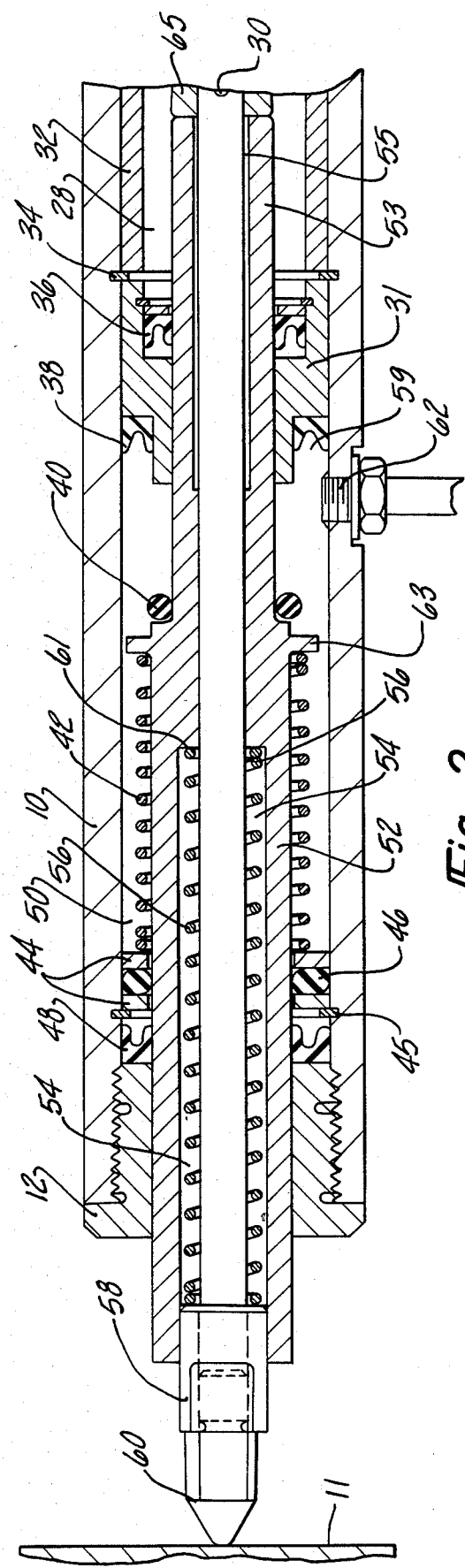
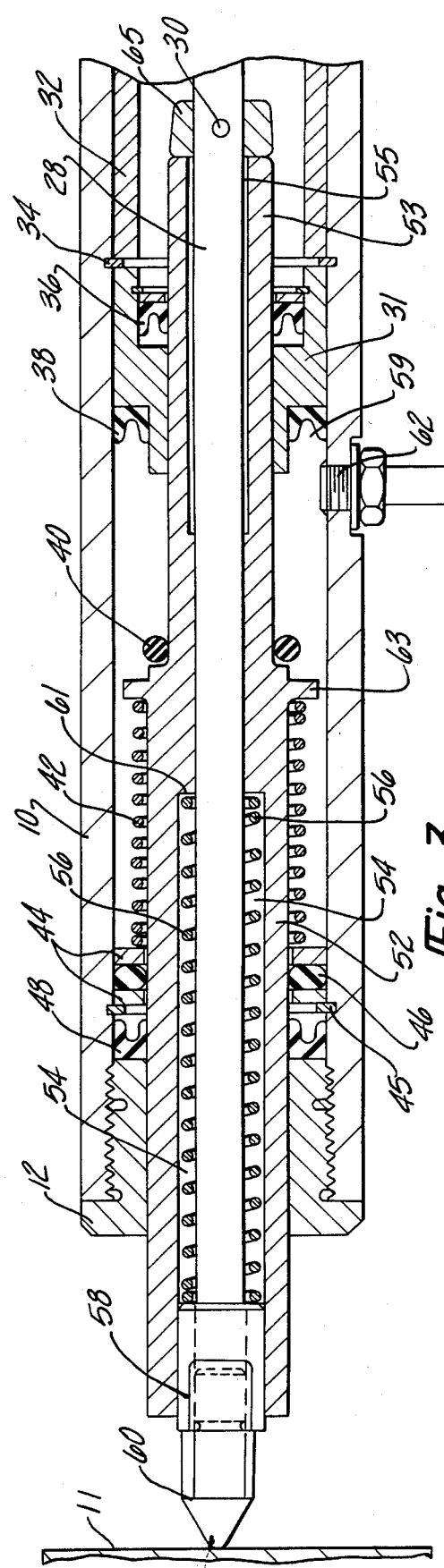

LOW CONTACT FORCE POSITION SENSING PROBE

DESCRIPTION

1. Technical Field

The present invention broadly relates to position sensing apparatus, especially of the type which physically contacts an object whose position is to be sensed, and deals more particularly with a contact probe which imposes minimal contact force on the object.

2. Background Art

Position sensing probes are employed in various applications where it is necessary to determine the position of an object relative to a reference point. For example, position sensing probes may be employed to determine the surface contour of an object and are also used in manufacturing assembly operations where it is necessary to gage the position of one part relative to another to assure proper fit between the parts following assembly thereof.

One type of known probe employed in the past employs a tip adapted to contact the object, which is mounted on the end of a shaft. The shaft is slidably mounted in a probe body and driven to an extended position away from the body and into contact with the object by a fluid powered piston. Movement of the shaft toward the object continues until the tip contacts the object following which the shaft is returned to its retracted position by a spring. The shaft forms a portion of an LVDT (linear voltage displacement transducer) which converts displacement of the shaft into electrical signals indicative of the position of the object relative to a reference point. Although this prior art probe is satisfactory in many applications, it possesses several shortcomings which severely limit its effectiveness or prevent its use in other applications. For example, some objects whose position must be sensed are shiftably mounted such that slight pressure applied thereto by the tip of a sensing probe displaces the object thereby resulting in an erroneous measurement of the objects' true position. Other objects may have surfaces which deform under the pressure of conventional sensing probe tips, thus also yielding erroneous position readings and/or permanent deformation of the object.

It is therefore a primary object of the present invention to provide a position sensing probe which employs a sensing tip which applies a very low pressure to an object whose position is to be sensed.

A further object of the invention is to provide a probe of the type described above employing a linear voltage displacement transducer for producing electrical signals corresponding to the position of the object.

A still further object of the invention is to provide a probe as described above having a probe body and a tip having an extendable contacting tip which is operated by a fluid driven motor within the body.

BRIEF DESCRIPTION OF THE DRAWINGS

In the drawings, which form an integral part of the specification and are to be read in conjunction therewith, and in which like components are designated by identical reference numerals in the various views:

FIG. 2 is a fragmentary, longitudinal sectional view of a portion of the probe shown in FIG. 1, with the piston assembly being partially extended and the tip initially contacting the object; and, FIG. 3 is a view similar to FIG. 2 but showing the piston assembly in a fully extended position.

BEST MODE FOR CARRYING OUT THE INVENTION

Figure 1:
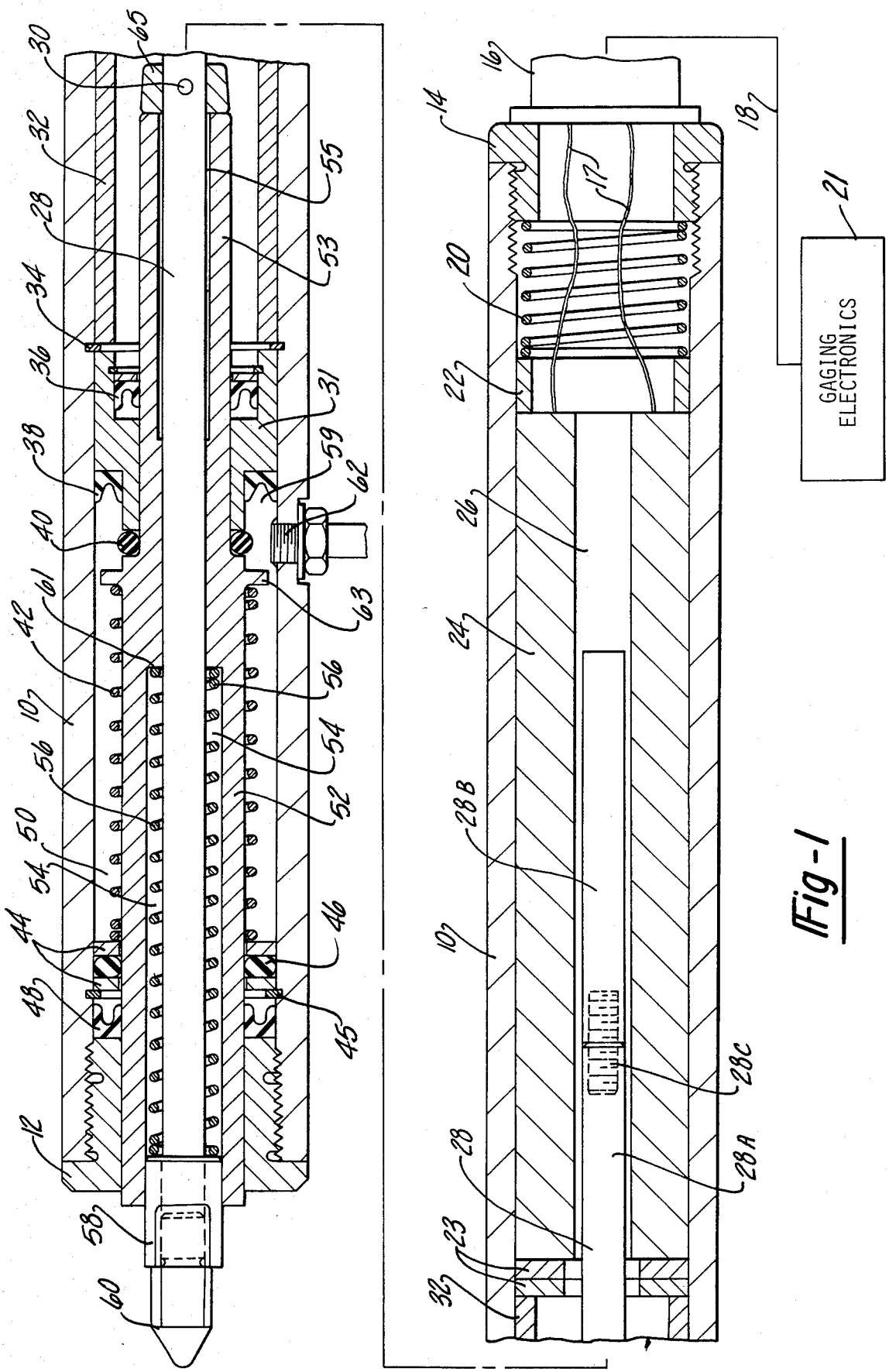
FIG. 1 is a longitudinal, sectional view of the sensing probe which forms the preferred embodiment of the present invention, the piston assembly being shown in a retracted position prior to contact of the tip with an object.

Referring to the drawings, the present invention involves a sensing probe comprising an essentially hollow cylindrical body 10 which is adapted to be positioned adjacent the surface 11 of an object whose position is to be sensed. A tip 60 of any suitable geometric configuration is adapted to contact surface 11 and is mounted for reciprocable movement on body 10 by means of a piston assembly whose details will now be described. The piston assembly includes an elongate piston member 52 which is mounted for sliding movement along the longitudinal axis of body 10 by means of a forward bearing 12 threadably received in one end of body 10 and a bulkhead 31 which is retained within the interior of body 10 by means of a snap ring 34.

An annular seal 48 abuts the interior end of bearing 12 and slidably engages the exterior wall of piston 52 in order to provide a fluid tight seal between the body 10 and the piston 52 at the forward end of the probe. The aft end of piston 52 is provided with a seal assembly 36 which slidably engages a reduced diameter portion 53 and provides a fluid tight seal between portion 53 and the aft end of cylindrical spacer 32. An additional annular seal 38 sleeved over the bulkhead 31 forms a fluid tight seal between the bulkhead 31 and the interior wall of body 10. An annular rubber buffer 40 is sleeved over the reduced diameter portion 53 of piston 52 and acts to cushion impact between piston 52 and bulkhead 31 when piston 52 is returned to its retracted position shown in FIG. 1, under the biasing force provided by a compression spring 42 sleeved over piston 52 within an annular space 50. One end of spring 42 bears against a buffer assembly which comprises a pair of annular rings 44 between which there is sandwiched a rubber ring 46. Rings 44, 46 are prevented from forward movement by a retainer ring 45 received within the interior sidewall of body 10. The other end of spring 42 bears against one side of an annular shoulder 63 on piston 52, the opposite face of shoulder 63 defining a piston surface. An annular space 59 between shoulder 63 and seal 38 defines a cavity within which fluid may be received through a fluid inlet 62 in one side of body 10.

Tip 60 is mounted on the outer end 28A of elongate shaft 28 by means of a bushing 58 which is slidably received within the forward end of a cylindrical cavity 54 in the forward end of piston 52. An intermediate section of shaft 28 is slidably received within a cylindrical bore in the reduced diameter portion 53 of piston 52, this latter mentioned bore being smaller in diameter than the cavity 54. It may thus be appreciated that bearing surfaces are provided at opposite ends of the piston 52 for slidably mounting shaft 28 therein. A stop member 65 is secured to an intermediate section of the shaft 28 by means of a rivet 30 or the like and is adapted to engage the inner end of piston 52 in order to limit the outward movement of tip 60 relative to piston 52. Shaft 28 also includes an inner end 28B defining a core secured to outer end 28A by a threaded bronze stud 28C.

The inner end 28B is disposed with three later discussed electrical coils 24 and is formed of magnetic material while outer end 28A is formed of non-magnetic material.

Shaft 28, and therefore tip 60, are biased to shift outwardly from piston 52 (toward the left as viewed in the drawings) by a compression spring 56 sleeved over shaft 28 within cavity 54 and captured between an annular shoulder 61 in piston 52 one end of the bushing 58.

Electrical conductors wound into three separate, longitudinally extending inductive coils generally indicated at 24 are received within the aft end of body 10 and are captured between washers 23 and spacer 22. A retaining spring 20 captured between spacer 22 and an end cap 14 and functions to hold the assembly of the washer 23, spacer 22 and coils 24 in place within body 10. End cap 14 is threadably received within one end of body 10 and has secured thereto an electrical receptacle 16 to which leads 18 are connected. Leads 18 of the coil 24 are connected with suitable gaging electronics 21 for purposes which will become later apparent. Coil 24 is provided with an elongate bore 26 therein for receiving the inner end 28B of shaft 28. Inner end 28B is of smaller diameter than bore 26 so as to form a moveable core within coils 24. Coils 24 and inner end 28B form a conventional linear voltage displacement transducer (LVDT). The LVDT produces an electrical output proportional to the displacement of the moveable cord defined by inner end 28B of shaft 28. The coils 24 comprise a primary coil and two secondary coils symmetrically disposed about the inner end 28B of shaft 28. The inner end 28B provides a path for magnetic flux linking the coils to produce a phase referenced output voltage. When the primary coil is energized by external AC source, voltages are induced in the two secondary coils. These coils are connected series opposing so the two voltages are of opposite polarity. Consequently the net output of the transducer is the difference between these voltages, which is zero when the inner end 28B is at the center or null position. As the inner end 28B moves from the null position, the induced voltage in the coil toward which the inner end 28B moves increases, while the induced voltage in the opposite voltage decreases. This movement produces a differential voltage output that varies linearly with changes in the position of inner end 28B. The phase of this output voltage changes abruptly by 180 degrees as the inner end 28B moves from one side of null to the other. This phase change through the null position indicates the direction of movement, while the output voltage indicates the distance that the inner end 28B has moved.

In operation, the probe is placed adjacent the surface 11 to be contacted and the position sensing process is initiated by introducing fluid, such as air, under pressure through inlet 62 into cavity 59. Pressurized fluid in cavity 59 causes a pressure differential to be exerted on piston 52 due to the difference areas (space 50 and cavity 59) exposed to the fluid pressure, thereby forcing piston 52 outwardly (toward the left as viewed in the drawings) from a retracted position shown in FIG. 1, against the biasing influence of spring 42 which ordinarily urges the piston 52 toward its retracted position shown in FIG. 1. Spring 56 ordinarily biases shaft 28 outwardly (toward the left as viewed in the drawings) until stop 65 engages the inner end of piston 52; thus, it may be appreciated that the shaft 28, and therefore tip 60 remains stationary relative to piston 52 until the tip 60 contacts surface 11. In other words, the entire assembly of piston 52, shaft 28 and tip 60 move as a single unit from the retracted position to an extended position thereof in which tip 60 contacts surface 11 as shown in FIG. 2.

It may be readily appreciated that as the shaft 28 moves outwardly along with piston 52, the length of inner end 28B of the shaft 28 disposed within the confines of coils 24 changes thus altering the mutual inductance between coils 24 via inner end 28B; this change in inductance produces electrical signals on lines 18 which are proportional to the linear displacement of shaft 28. Gaging electronics 21 processes the electrical signals to provide a measurement of the position of surface 11 in a conventional manner as described in U.S. Pat. No. 4,292,740. When the piston 52 has extended sufficiently to cause tip 60 to engage surface 11, linear displacement of tip 60 and shaft 28 ceases and the piston 52 continues to be displaced outwardly toward surface 11 under the pressure of fluid in cavity 59. Continued linear displacement of piston 52 relative to shaft 28 results in loading of spring 56 and continues until the pressure of fluid in cavity 59 is approximately equal to the oppositely directed force imposed on piston 52 by spring 42. It may be appreciated that continued displacement of piston 52 relative to shaft 28 does not affect the position reading provided by gaging electronics 21 since the body 10, coil 24 and shaft 28 remain stationary after tip 60 contacts surface 11. Preferably, the biasing influence exerted by spring 56 is quite low so as to exert minimal pressure on surface 11, regardless of the pressure exerted on piston 52 by the pressurized fluid.

After the position of surface 11 has been sensed, fluid pressure is released and fluid within cavity 59 flows out of body 10 through inlet 62, thus allowing piston 52 to slide back toward its' retracted position. As piston 52 retracts, tip 60 remains in contact with surface 11 until stop 65 engages the end of piston 52; at this point, piston 52, shaft 28 and tip 60 move as a single unit back toward the position shown in FIG. 1 until buffer 40 engages the end of bulkhead 31.

From the foregoing, it may be appreciated that the position sensing probe described above not only provides for the reliable accomplishment of the objects of the invention but does so in a particularly effective and economical manner. It is recognized, of course, that those skilled in the art may make various modifications or additions to the preferred embodiment chosen to illustrate the invention without departing from the spirit and scope of the present contribution to the art. Accordingly, it is to be understood that the protection sought and to be afforded hereby should be deemed to extend to the subject matter claimed and all equivalents thereof fairly within the scope of the invention.

I claim:

1. A probe for sensing the position of an object relative to a reference point comprising:
    a body;
    a tip adapted to contact the object;
    a piston reciprocably mounted in said body for movement along an axis toward and away from the object;
    means mounting said tip on said piston and including means for allowing displacement of said tip along said axis relative to said piston, whereby said piston may continue displacement thereof along said axis toward the object after said tip has contacted the object;

means for sensing the displacement of said tip relative to said body;

means defining a fluid pressure chamber in said body bounded in part by a surface of said piston and arranged to effect movement of said piston toward the object from a retracted position to an extended position in response to the introduction of pressurized fluid into said chamber; and biasing means within said body for normally urging said piston toward said retracted position thereof in the absence of pressurized fluid in said chamber acting on said piston.

2. The probe of claim 1 wherein said sensing means includes a core of magnetic material coupled with said tip for movement with said tip, and an electrical coil within said body and surrounding said core, displacement of said core relative to said coil resulting in the generation of electrical signals corresponding to the displacement of said tip.

3. The probe of claim 1, wherein said mounting means includes:
a longitudinal bore within said piston; and
a shaft longitudinally slideable within said bore and having said tip connected to one end thereof.

4. The probe of claim 3, wherein said mounting means includes:
a spring sleeved over said shaft;
a member connecting said tip with said one end of said shaft, said member including an annular shoulder forceably engaged by said spring,
said bore including first and second sections, said first section being of greater diameter than said second section, said spring being captured within said first section.

5. Apparatus for sensing the position of an object comprising:
a housing including an elongage cylindrical body;
a first member within said housing and including an elongate piston;
first mounting means for mounting said first member for bidirectional movement along a reference axis within said housing, said first mounting means including a pair of spaced apart bearings in said body;
drive means coupled with said first member for producing bidirectional movement of said first member, said drive means including means within said body defining a fluid chamber, said fluid chamber having said piston slideably mounted therein and adapted to be coupled with a source of pressurized fluid for driving said piston in one direction along said axis toward the object, said drive means further including a spring for returning said piston in the absence of fluid pressure in said chamber;
a second member;
means on one end of said second member for contacting the object on movement of said piston in said one direction along said axis;
second mounting means for mounting said second member on said piston for bidirectional movement along said axis, including means for preventing movement of said second member relative to said piston along said axis until said contacting means contacts the object; and
means responsive to movement of said second member for developing electrical signals correpsonding to the magnitude of displacement of said contacting means toward the object.

6. The apparatus of claim 5, wherein said developing means includes a linear voltage displacement transducer responsive to displacement of said shaft.

7. A probe for sensing the position of an object relative to a reference point comprising:
an elongate body positionable in a known position relative to said reference point;
means for contacting said object;
an elongate piston assembly reciprocably mounted within said body for displacement between a retracted position in which said contacting means is spaced from said object and an extended position in which said contacting means contacts said object, said piston assembly including:
1. a piston member having a longitudinal bore therein opening in one end of said piston,
2. a shaft having said contacting means secured to one end thereof and longitudinally and slideably positioned within said bore with said one shaft end projecting beyond said one piston end,
3. a spring sleeved over said shaft within said bore and acting in compression between said shaft and said piston and effective to normally urge said shaft to move within said bore in a direction to move said one shaft end away from said one piston end, and
4. coacting stop means on said shaft and on said piston limiting movement of said shaft within said bore in said direction but allowing movement of said shaft within said bore in the opposite direction, said stop means and said spring normally coacting to prevent sliding movement of said shaft within said bore relative to said piston but said spring yielding upon contact by said contacting means with said object to allow sliding movement of said shaft relative to said piston in said opposite direction, whereby displacement of said piston toward said extended position thereof may continue while displacement of said shaft has ceased; and means for sensing the displacement of said shaft relative to said body.

8. A probe for sensing the position of an object relative to a reference point comprising:
a body;
a tip adapted to contact the object;
a piston reciprobably mounted in said body for movement along an axis toward and away from the object;
means for mounting said tip on said piston and including means for allowing displacement of said tip along said axis relative to said piston, whereby said piston may continue displacement thereof along said axis toward the object after said tip has contacted the object;
means for sensing displacement of said tip relative to said body;
means for displacing said piston along said axis from a retracted position to an extended position toward the object;
biasing means within said body for normally urging said piston toward said retracted position thereof;
said mounting means including a bore extending longitudinally in said piston and a shaft slideably disposed in said bore and having said tip secured to one end thereof;

said displacing means including an annular portion on said piston having a first face against which force may be imposed by pressurized fluid; and said biasing means including a spring sleeved over said piston and acting between another face of said piston annular portion and said body.

9. A probe for sensing the position of an object relative to a reference point comprising:

a body;

a tip adapted to contact the object;

a piston reciprocably mounted in said body for movement along an axis toward and away from the object;

means for mounting said tip on said piston and including means for allowing displacement of said tip along said axis relative to said piston, whereby said piston may continue displacement thereof along said axis toward the object after said tip had contacted the object;

means for sensing displacement of said tip relative to said body;

means for displacing said piston along said axis from a retracted position to an extended position toward the object;

biasing means within said body for normally urging said piston toward said retracted position thereof;

said mounting means including a bore extending longitudinally in said piston and a shaft slideably disposed in said bore and having said tip secured to one end thereof;

said probe further including a pair of spaced apart bearings in said body;

said piston being slidably mounted in said bearings;

said probe further including means defining a fluid chamber within said body between said bearings; and said biasing means including a spring sleeved over said piston and disposed between said fluid chamber and one of said bearings.

* * * * *